W. V. LANDER.
IMPREGNATING COMPOSITION AND METHOD OF MAKING SAME.
APPLICATION FILED DEC. 20, 1916.
1,277,322.
Patented Aug. 27, 1918.
2 SHEETS—SHEET 2.
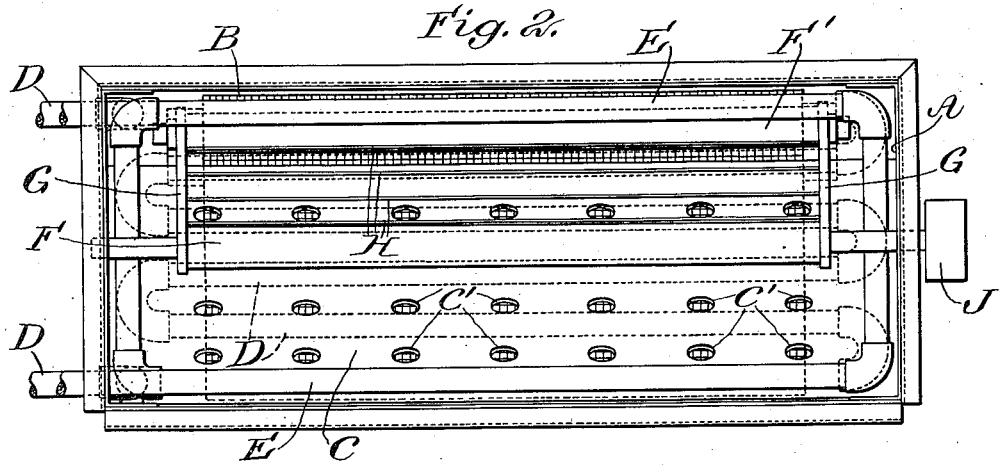
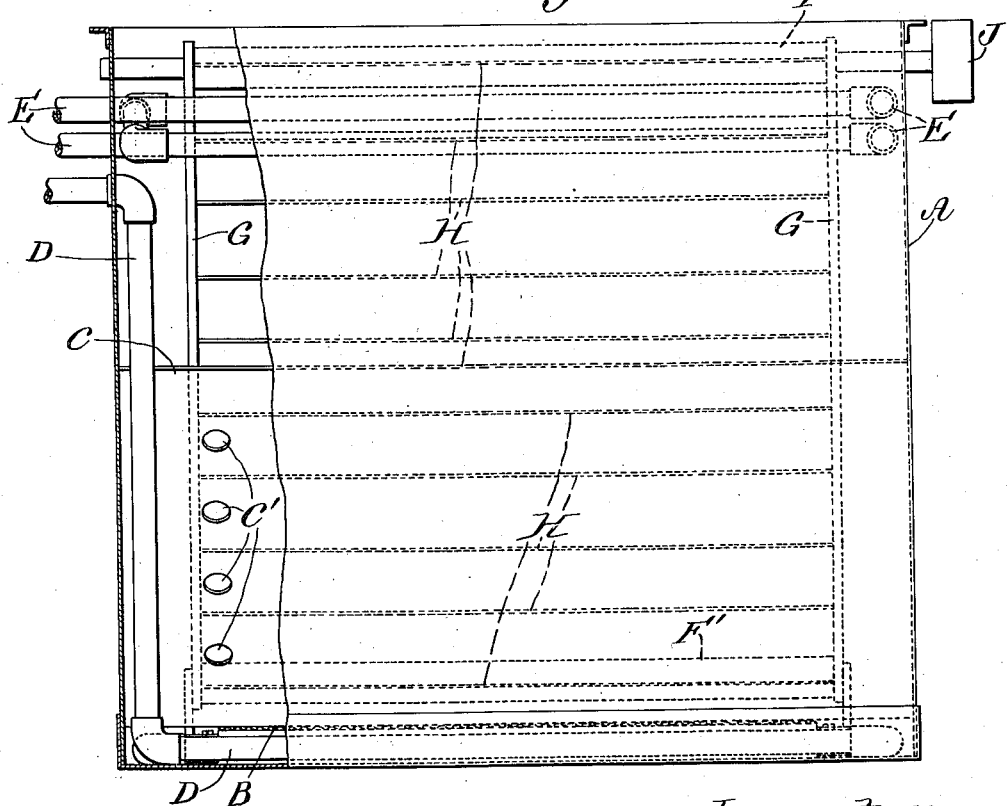
Inventor:
Wentworth V. Lander
by Roberts, Roberts & Cushman
Attorneys.

UNITED STATES PATENT OFFICE.

WINTWORTH V. LANDER, OF NEWTON, MASSACHUSETTS, ASSIGNOR TO GENERAL INDURATING CORPORATION, A CORPORATION OF NEW YORK.

IMPREGNATING COMPOSITION AND METHOD OF MAKING SAME.

1,277,322.

Specification of Letters Patent. Patented Aug. 27, 1918.

Application filed December 20, 1916. Serial No. 137,959.

*To all whom it may concern:*

Be it known that I, WINTWORTH V. LANDER, a citizen of the United States, and resident of Newton, in the county of Middlesex and State of Massachusetts, have invented new and useful Improvements in Impregnating Composition and Methods of Making Same, of which the following is a specification.

My invention consists in a new composition of matter, adapted to the filling or impregnation of bodies characterized by porous or interstitial structure, and which are therefore bibulous, in the mode of preparing or compounding the said composition of matter, in the method of treating bibulous bodies with the said composition, and in the product resulting from the impregnation of bibulous bodies with the said composition.

The bodies or substances which are susceptible of treatment by impregnation with my new composition of matter are exemplified by compressed wood-pulp articles, such as pulp boards, pails, toilet seats, etc., and also by flexible sheet materials such as paper, textiles, paper board, leather board, and leather, all of which are characterized by interstitial structure and capable of taking up a liquid by capillary absorption. Interstitial or porous structure connotes a degree of structural discontinuity; the impregnation of such a structure with a substance which in whole or in part fills the interstices or pores increases or enhances the structural continuity of the body as a whole, by substituting for the gaseous content of the interstices or pores, a viscous or solid content, according to the physical character of the filling material.

One of the main objects of my invention is to render porous or bibulous bodies impervious or resistant to water by reason of the increased or enhanced internal structural continuity imparted to such bodies by my new composition, and this property is common to all such bodies after adequate treatment by my process and composition of matter. In other respects the quality of porous or bibulous bodies so treated is susceptible of variation in response to variation in the proportions of the ingredients of my new composition of matter, and in the method of treatment with such composition.

In the drawings hereto annexed, which illustrate apparatus for the performance of my new process, Figure 1 is a vertical cross section of a tank for treating such porous bodies as skins, hides, textiles, etc.;

Fig. 2 is a top plan view of the same; and

Fig. 3 is a vertical longitudinal section.

Figure 1:
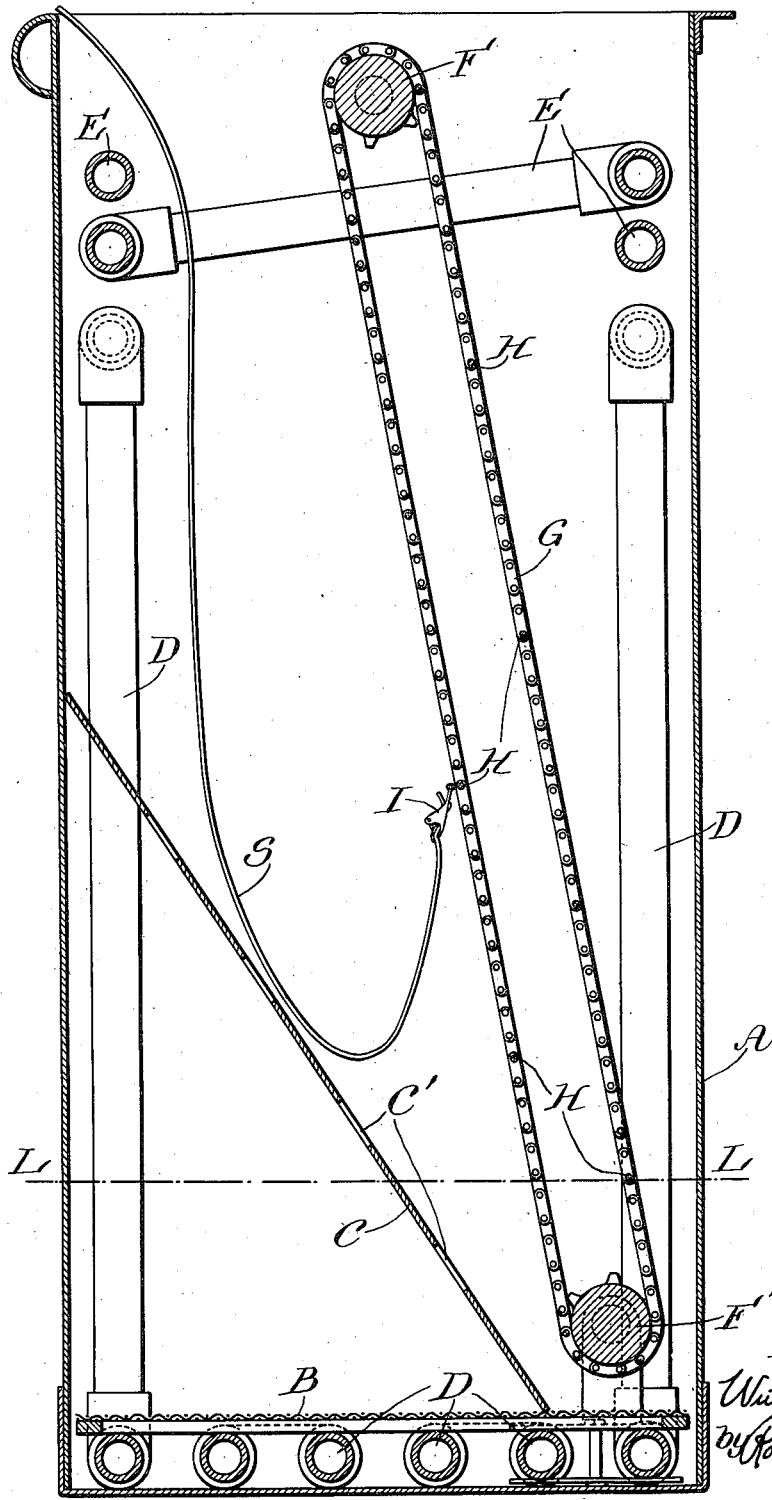
Fig. 1 shows the apparatus on a scale larger than that of Figs. 2 and 3.

Specifically, my new composition of matter for the filling or impregnation of porous or bibulous bodies is comprised in a solution in gasolene of common rosin (colophony) and the heavy greasy jelly which is the residue from the distillation of paraffin-base petroleum. Both the rosin and the petroleum residue are inherently water-resistant substances; the gasolene constitutes a vehicle or carrier which readily penetrates the pores of a porous body, carrying into it the water-resistant ingredients, and depositing them therein by subsequent volatilization or evaporation.

The composition itself, which imparts new or improved qualities to bodies containing it, is specifically represented by colophony and petroleum residue, in intimate association with each other.

The functionally valuable characteristics of a carrier of the water-resistant ingredients are, that it shall be a solvent of the said ingredients or a liquid capable of sustaining them in a condition of extension, shall be capable of wetting the substance of which a porous body to be treated is composed, and shall be volatile or evaporable, so as to leave the ingredients carried into the porous or bibulous body, lodged in the pores or interstices of the same after treatment. Resins other than colophony may be used as the resinous ingredient, with securement of substantially similar results.

I am aware that compositions containing a resin and an asphalt, a resin and paraffin, or a resin and an oil dissolved in a volatile carrier have been suggested for the purpose of impregnating and water-proofing porous bodies such as wood-pulp articles or paper board, and that the function of the volatile carrier in such cases is the same in substance as that of the carrier (specifically, gasolene) in my new composition of matter. But none of the proposed compositions of matter, so far as I am informed or have been able to ascertain by observation and experiment, has possessed the range of application, or has been capable of producing the variety of effects, which are characteristic of the composition I have invented and which I describe herein. Moreover, the addition of a substantial amount of commercial paraffin is objectionable, inasmuch as it hinders impregnation, forms a layer over the surface of the article treated and exudes. Whether the carrier be gasolene or some other volatile or evaporable liquid which may answer the purpose in a measurable degree, or whether common rosin or some other resin be used as the resinous ingredient, the employment of petroleum residue (the heavy, greasy residue from the distillation of paraffin base petroleum) renders the composition capable of securing new and useful results and susceptible, moreover, of producing a wide variety of results and physical characteristics in product, provided the proportions of the water-resistant ingredients be varied. A series of practical demonstrations has shown that a composition, characterized by the presence of petroleum residue, and a resin, and introduced by means of a volatile or evaporable carrier is capable of indurating and toughening porous bodies—such as wood-pulp articles, leather or articles made therefrom, or of toughening and rendering pliable materials such as leather or textiles; and in the case of leather particularly, of filling, plumping, refining the grain, increasing softness and pliability, increasing tensile strength, and, generally speaking, so improving the physical characteristics of leather as to raise its grade and market value. Cloth of all kinds and articles made therefrom can be effectively waterproofed by means of this composition, without suffering any detriment or serious loss of pliability, and with very little increase in weight. If, on the other hand, increase in weight is a desideratum, the composition may be varied in proportions of ingredients to produce this result.

The general rule to be derived from my demonstrations and observations is, that in order to stiffen and indurate porous material, the resinous ingredient should be increased in proportion; while in order to produce soft and pliable products, the petroleum residue should increase proportionately. Greater or less concentration of both these ingredients in the solution in the volatile or evaporable carrier will make the characteristic effect more or less marked in the impregnated product.

The mode of compounding this composition of matter and preparing it for introduction into a porous or bibulous body, which I have adopted in practice and believe to be the best, is as follows: First, dissolve or "cut" a resin (preferably rosin, since it is cheaper than other resins) in a volatile solvent or carrier (preferably gasolene). Second, add petroleum residue and heat the mixture. For such purposes as impregnation and induration of wood-pulp articles, or the stiffening and toughening of pliable materials, I have found the following proportions and operations to be suitable: Mix rosin and gasolene in the proportions of four pounds of rosin to one gallon of gasolene (approximately six pounds). When the rosin has been completely dissolved or "cut" by the gasolene, pour off the clear liquid from such sediment as may be present, or filter out the sediment. Then mix petroleum residue (the greasy jelly which constitutes the residue from the various processes of refining petroleum oil characterized by a paraffin base) in the gasolene-rosin solution, using about three pounds of petroleum residue to the gallon of solution, and heat the mixture, when the petroleum residue will also go into solution. Solution of the petroleum residue in the cold is slow, though it may be accelerated by working the petroleum residue in the gasolene-rosin solution. The final proportions of the composition made according to this formula will be—approximately—four pounds of rosin, three pounds of petroleum residue, and six pounds of gasolene. If it is intended to produce softer and more pliable articles, as of leather or textile material, the proportions of rosin and petroleum residue will be varied; the more preponderant the petroleum residue, the softer and more pliable will be the treated material. Different weights of filler per square or cubic inch of material treated will be obtained by variations in the dilution of the dissolved materials (petroleum residue and resin) in the volatile carrier.

Porous or bibulous material to be treated with this preparation of the composition may be immersed in it, or coated or sprinkled with it, according to the degree of impregnation desired. Preferably the materials to be treated will be immersed in the preparation of the composition, and preferably also the carrier-liquid and composition should be used hot, since heat makes the composite liquid thinner and more promptly penetrative. If desired, and when the character of the porous material permits, the material to be treated may be heated also before immersion. The carrier with the composition penetrates the porous body immersed in it, expelling air from the pores and interstices, and when impregnated to the desired degree, the porous body is removed from the carrier-bath and dried, either with or without artificial heat, as may be determined on. The volatile carrier is dissipated, leaving the intimate mixture or composition of petroleum residue and resin lodged and fixed in the pores of the material. These, according to the proportions of the impregnating substances, their quantity per unit of space, and also according to the physical peculiarities of the porous body itself, impart to the product physical characteristics which will be herein more particularly illustrated by examples. In all cases, however, the impregnated body will be rendered waterproof or water-resistant.

The application of my new composition to leather deserves particular description, since leather products treated with it take on properties improved in degree or quality. I am informed that, although many devices have been sought and some resorted to for rendering leather waterproof, i. e., impervious to water in the sense that a rubber sheet is impervious, no permanently waterproof leather has yet been produced. Fillers or coatings, in themselves impervious to water, such as patent leather finish, are well known; but these, while protective as long as they persist unbroken, do not render the leather itself water-resistant or water proof. Greasy or oily fillers temporarily impart water-resistant properties to leather, but these work out of the leather sooner or later, and leave it susceptible to water-penetration, as before.

By impregnating the pores of leather with the composition of petroleum residue and a resin, according to my invention, the leather itself, as a sheet of material, becomes permanently waterproof. The petroleum residue prevents the leather from becoming stiff or brittle, since this filling material is in itself a pliable and softening agent. Alone, it would soon work out of the leather, rendering the surface greasy and liable to spot or grease other objects, and leaving the leather itself hardly, if at all, more waterproof than originally. The presence of the resin holds and fixes the composition in the pores of the leather where it is deposited, as by the evaporation of the solvent or carrier; a resin alone, if deposited in the pores of leather would render the product stiff and brittle; the qualifying presence of petroleum residue prevents this.

The mode by which I have treated leather and obtained this new impregnated leather is illustrated in the accompanying drawings, and will suggest modes and apparatus for treating other porous bodies.

In these drawings, A represents a tank, (which may be of galvanized iron) about two feet wide, five feet high, and as long as the nature of the work requires. Heating pipes D, for steam or other heating agent, lie at the bottom of the tank A, and a perforated or wire-mesh screen is placed over these pipes, to prevent a skin from touching the hot pipes. C is an inclined apron having a number of large perforations C' to facilitate circulation of fluid. This apron is provided for the purpose of preventing a skin from falling and crumpling on itself at the bottom of the tank, when introduced for treatment. Near the top of the tank A and adjacent to the sides thereof there is a coil of pipe E, through which a cooling fluid is circulated so as to supplement the cooling and condensing effect of the upper parts of the walls of the tank A. By prolonging the walls of the tank upward, the cooling and condensing effect can be obtained without the employment of cooling pipes or other refrigerating or condensing devices. Roll-shafts F and F' at the top and bottom of the tank A, respectively, carry conveyer chains or belts G which are provided with cross-rods H, on which clips or other convenient attaching devices are secured. The pulley J (Figs. 2 and 3) driven from any suitable source of power, rotates shaft F and thus causes the conveyer to move in the tank A.

The tank being filled to the level L, L', (say nine inches to a foot above the false bottom or grating B) with the petroleum residue—resin—gasolene composition, steam is circulated through the pipes D, causing the composition to boil. The vapor generated rises in the tank, is condensed and falls back either as a mist or as liquid which trickles down the sides of the tank. Immediately above the liquid composition there is maintained an atmosphere of gasolene vapor. The effect of the condensation is to keep gasolene vapors from escaping into the room, in which, although gasolene is being boiled in an open vessel, there will be hardly a noticeable gasolene odor.

A skin, as for instance a sheep or calf-skin, coltskin, cowhide, any kind of skin or hide, is attached to clips H and carried down into the tank A. The operator holds the free end of the skin S until it may be lowered down on to the inclined apron C, where the leather clings slightly on account of the wetness of the surface of the apron, and is drawn through the boiling composition and lifted out, as the conveyer G travels. As the hide or skin enters the composition the air is driven out of the pores and the composition solution strikes in, thoroughly impregnating the leather. As the leather is drawn out of the composition it is bathed in the vapor which occupies the lower part of the tank, over the liquid level, and this vapor-washing removes from the surface of the leather all streaks of greasy material which otherwise might remain and degrade the leather. This vapor bath degreases the leather to a slight degree, just enough to clean its surface thoroughly. The leather is then hung up to dry, either in the open, or in a drying room. The physical character of the product depends on the selection of proportions of ingredients in the treating composition, and almost any desired variation in result can be obtained after experience with, and manipulation of, the composition. For instance, to make an improved waterproof sole leather, use equal parts of petroleum residue and rosin, and an amount of gasolene which weighs about eighty per cent. of the combined weight of the other two ingredients. If the gasolene is of specific gravity sixty, heat it to 200° F. in the treating tank and regulate the travel of the conveyer so that the leather will be immersed about fifteen seconds. The product, after drying, will be firmer, harder, and less flexible than the untreated leather, will be permanently waterproof, much more resistant to wear, and has a surface susceptible of receiving a high polish.

If a leather for gloves or light shoe uppers is to be produced, say from calfskin, use to each gallon of gasolene two pounds of rosin and three pounds of petroleum residue, and treat the leather with this composition as hot as 200° F. or higher. The leather usually need not be immersed longer than ten seconds. The product is well plumped, the quality and feel of the grain refined and improved; the leather is soft and flexible, of higher tensile strength than originally, and improved in grade. It is, like all products thus treated with my composition, completely waterproof. This treatment does not seem to affect coloring matter in the leather, but imparts improved character to all kinds of leather without incidental detriment. Cemented laminated leather belting can be advantageously treated with my composition which imparts the waterproof character to the belting, increases its tensile strength, decreases its liability to stretching, and gives it a traction surface which requires little or no belt-dressing.

The vapor bath given to leather on emerging from the liquid composition in apparatus such as above described is particularly important and beneficial, since it prevents any greasy streaks or exudations from remaining on the surface of the leather.

As to treatment of other flexible materials than leather; I have waterproofed cloth garments, tent cloth and miscellaneous textile articles, by giving them a single treatment in all essentials like that above prescribed for flexible glove or upper leather. I have also treated wood-pulp articles, using a composition of four pounds of rosin and three pounds of petroleum residue to the gallon of gasolene, immersing the wood pulp articles in the composition at a temperature of about 200° F., leaving them immersed long enough to insure thorough penetration. The product when dry is highly indurated, tough, and takes a high polish. The complete waterproof character of the product adapts such impregnated wood pulp to a variety of uses. The articles of wood pulp will be molded to their desired and intended shape before impregnation.

As a general rule, the higher grades of gasolene—such as commercial 70 to 75 specific gravity gasolene—form a composition which need not be heated to so a high a point for good results in treatment of porous bodies. With such gasolene, the temperature need not be much above 150° F.

The time of immersion of a body to be impregnated by my new composition will depend on the degree of penetration or impregnation desired, the thickness of the body, the degree of fineness of its pores or interstices, the temperature of the composition, and the degree of concentration of soluble ingredients therein. By variations in these factors almost any conceivable character or degree of impregnation can be obtained.

Both resin and the petroleum residue are inherently water-resistant. A compound of the two, made by heating them together, either with or without a diluent, solvent or carrier, is likewise water resistant. When the pores or interstices of a porous or bibulous body are impregnated by this compound, the function of the resin is, in part, to retain the composition in the pores or interstices; the petroleum residue, being a greasy and somewhat fluid constituent, would of itself tend to work out of the pores or interstices. The resin prevents this, it makes the composition with its greasy or lubricant component, stick in the body. The function of the petroleum residue, in part, is to lubricate, render pliant and tractable, or to toughen rather than stiffen, a body which, if impregnated with a resin alone, would be stiff and brittle. The virtues or qualities of one ingredient correct the tendencies of the other. The composition, while partaking of the qualities of resin and petroleum residue, is neither of these, nor is it a mere aggregation of the two. Each performs its function in conjunction with that of the other; the joint result is more than, or different from, an aggregate of the separate results which might be produced by use of each separately.

A composition of these two ingredients may be prepared simply by heating the components together, and each composition, when fluid and hot, will in a measure penetrate the pores or interstices of a porous or bibulous body, and will thus impregnate it. But such a liquid composition is not so capable of wetting solid porous bodies as is a liquid such as acts as a solvent or diluent for the impregnating components. Capillary attraction of the solid body for a liquid is a physical phenomenon which—as in the case of gasolene—may be taken advantage of to secure quick impregnation of a porous body with substances which of themselves possess little or inferior capillary attraction for the body itself. Hence the employment of a liquid diluent or carrier, having capillary attraction for the porous body and being therefore capable of promptly wetting it, is a characteristic of the preferred method above described. Should the impregnation of a porous body by the impregnating substances themselves, in a liquid state, be resorted to, the surface of the body may be cleansed or washed with a solvent of the impregnating materials either in liquid or vaporous condition, if it be desired to remove the greasy and resinous substances from the surface.

The method above described and the effect of impregnation of miscellaneous porous or bibulous bodies with the new composition of matter characterized by petroleum residue and a resin in intimate association with each other, whatever be the specific peculiarity of the porous or bibulous body, or whatever the proportions of the ingredient elements of the composition has this persistent characteristic or quality, that by it there is produced in the porous or bibulous body an internal structural continuity of higher degree than is possessed by the body prior to its treatment with the composition. This improved or enhanced continuity of substance is responsible for the imperviousness to water which results from impregnation, in conjunction with the water-repellant or resistant properties inherent in the impregnating composition itself. Enhanced continuity is consistent, also, with the increase in toughness produced in bodies indurated with the composition in which resin predominates, as well as with the improved smoothness and pliability of other bodies, impregnated with the composition in which the lubricant petroleum residue predominates.

As employed in the present specification and claims the term "petroleum residue" connotes the heavy greasy jelly which is the residue from the distillation of paraffin-base petroleum.

What I claim and desire to secure by Letters Patent, is:—

1. A composition of matter, adapted for use in the impregnation of porous or bibulous bodies, composed essentially of petroleum residue and a resin in solution in an evaporable carrier.

2. A composition of matter, adapted for use in the impregnation of porous or bibulous bodies, composed essentially of petroleum residue and colophony in solution in an evaporable solvent.

3. A composition of matter, adapted for use in the impregnation of porous or bibulous bodies, composed essentially of petroleum residue and colophony in solution in gasolene.

4. A composition of matter, adapted for use in the impregnation of porous or bibulous bodies, composed essentially of petroleum residue and a resin in solution in an evaporable solvent itself a distillation product of petroleum.

5. A composition of matter, adapted for use in the impregnation of porous or bibulous bodies, composed essentially of petroleum residue and colophony in solution in an evaporable solvent itself a distillation product of petroleum.

6. The method of making a composition of matter adapted for use in the impregnation of porous or bibulous bodies, which consists in dissolving a resin in an evaporable carrier and thereafter dissolving petroleum residue in the resin-solution.

7. The method of making a composition of matter adapted for use in the impregnation of porous or bibulous bodies, which consists in dissolving colophony in an evaporable carrier and thereafter dissolving petroleum residue in the colophony solution.

8. The method of making a composition of matter adapted for use in the impregnation of porous or bibulous material, which consists in dissolving a resin in an evaporable derivative of petroleum distillation and thereafter dissolving petroleum residue in the resin-solution.

9. The method of making a composition of matter adapted for use in the impregnation of porous or bibulous bodies, which consists in dissolving a resin in an evaporable solvent, heating the resin-solution and dissolving petroleum residue therein.

10. The method of making a composition of matter adapted for use in the impregnation of porous or bibulous bodies which consists in dissolving a resin in an evaporable derivative of petroleum distillation, heating the resin solution and dissolving petroleum residue therein.

11. A non-paraffinic composition of matter, adapted for use in the impregnation of porous or bibulous bodies, comprising petroleum residue and a resin in solution in an evaporable carrier.

12. A non-paraffinic composition of matter, adapted for use in the impregnation of porous or bibulous bodies, comprising petroleum residue and colophony in solution in an evaporable carrier.

13. A non-paraffinic composition of matter, adapted for use in the impregnation of porous or bibulous bodies, comprising petroleum residue and colophony in solution in gasolene.

Signed by me at Boston, Massachusetts, this fifteenth day of December, 1916.

WINTWORTH V. LANDER.